Dec. 30, 1941. H. C. RHODE 2,268,060
ELECTRIC INSULATING BUSHING
Filed May 27, 1939 2 Sheets-Sheet 1

INVENTOR
H. C. Rhode
BY Roy A. Plant
ATTORNEY

Patented Dec. 30, 1941

2,268,060

UNITED STATES PATENT OFFICE 2,268,060

ELECTRIC INSULATING BUSHING

Herman C. Rhode, Battle Creek, Mich.

Application May 27, 1939, Serial No. 276,132

8 Claims. (Cl. 174—83)

The present invention relates broadly to electric insulators, and in its specific phases to insulators adapted for use in the outlet end of conduits, raceways, and the like.

The present application is a continuation-in-part of my co-pending patent application, Serial No. 230,003, filed September 15, 1938.

The common difficulty of using electric wires passed through a tubular metal conduit or raceway is that, at the outlet end of same, the constant pressure on the wire insulation due to the weight of the wires, or pull thereon, causes the insulation to gradually break down and allow the wires to short circuit on the end of the conduit at the point of bending over the edge thereof. Vibration also causes the insulation on the wires to wear through or break down and permit shorting on the outlet end of the conduit. A sheet metal bushing for the end of the conduit has been proposed in U. S. Patent No. 1,842,216 to Thomas, but this obviously does not solve the problem for the shorting difficulty is still present. The use of a thin sheet fiber bushing in the end of a metal conduit has been proposed in U. S. Patent No. 1,801,549 to Frederickson, but this does not solve the problem since there is nothing to hold the sheet fiber bushing in place when wires are drawn through same, and after installation, vibration, and contraction and expansion forces may cause the bushing to work out of the end of the conduit so that the shorting danger is again present. In U. S. Patent No. 1,742,488 to Schneider et al. a prong-end sheet fiber insulator with a rib to contact the end of a flexible conduit is described. This insulator has a pressed bead on the point of the prong and the whole preferably coated with a greasy or wax-like element for moisture proofing the sheet fiber. The thin sheet fiber insulator in addition is slit lengthwise at the base of the prong to permit installation. This insulator also has the same tendency to work out of the conduit and reestablish the shorting danger unless held in place by separate members, and moreover greasy or wax-like coatings for insulators are now known to be ineffective after a short time and moisture present in the conventional fiber or paper board insulator stock facilitates shorting danger. The use of a straight lengthwise slit in the thin sheet fiber bushing at its bottom face also permits direct shorting on the metal conduit at the abutting open edges of the slit when the insulation on the electric wires fails. Under such conditions, safety, as well as reduction of repair expense, requires that the end of the conduit or raceway be provided with an electric insulating bushing of special construction, and this is particularly necessary where insulation covered conductors of #4 B. & S. gauge or larger are deflected at an angle of 30° or more at the point of emergence from the metal conduit. It is with these difficulties and the solution of same in mind that the present invention has been devised.

Accordingly, among the objects of the present invention is the provision of a special form of electric insulating bushing suitable for use at the outlet end of conduits, raceways, in terminal boxes, or the like.

Another object is to provide an electric insulating bushing which may be installed in new conduits and raceways before wiring and also may be installed in the open ends of old conduits or raceways without the necessity of cutting and reconnecting the wires.

Another object is to provide an electric insulating bushing which is slit down one side to provide an opening through which conductors of electricity may be slipped prior to installation of the bushing in the end of a suitable metal conduit or raceway already in place.

A further object is to provide a lengthwise cut electric insulating bushing which in some forms may have chamfered edges, and in other forms oblique or diagonal edges at the cut, so that the edges may readily overlap and telescope when squeezed together, thus facilitating installation in the end of an electric conduit.

A further object is to provide an electric insulating bushing wherein the under edge of the diagonal cut acts to insulate the electric conductors from the metal conduit at the cut.

A further object is to provide the electric insulating bushing with a means, such as a rib, adapted to releasably hold the bushing in place after installation.

A further object is to provide an electric insulating bushing which is constructed so as to be semi-locked in place against removal due to forces such as are involved in pulling conductors out of or through the conduit in which it is installed.

A still further object is to provide an electric insulating bushing which is cheap to manufacture, simple, safe, and easy to install and remove.

Other objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

Figure 1:
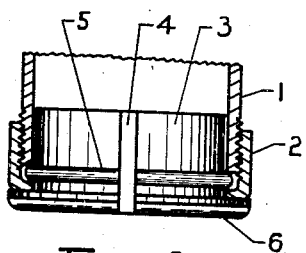
Figure 1 is a partially sectioned assembly view showing one form of the electric insulating bushing of the present invention installed in the outlet end of a round tubular electric conduit.
Figure 2:
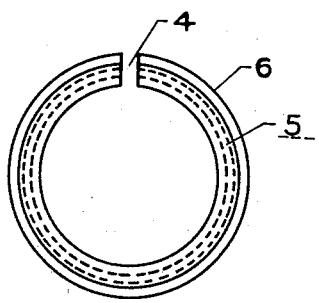
Figure 2 is an end view of the bushing as viewed from the bottom of Figure 1.

Referring more particularly to the drawings, Figure 1 shows a round metal conduit 1 having screwed thereon an open end metal cap 2 which is also commonly called a metal bushing. Inserted in the end of the conduit and extending through the open end of the cap is an electric insulating bushing 3 slit longitudinally at 4 to permit same to be reduced in diameter by compression for slipping into the end of the conduit. The bushing 3 is preferably provided with a rib 5 located and adapted for locking engagement on cap 2 with the rib resting in the groove between the end of conduit 1 and the turned-in outer end of cap 2. For ease of handling in inserting and removing, as well as protection of the electric wires, the bushing is preferably provided with a flanged end 6.

Figure 3:
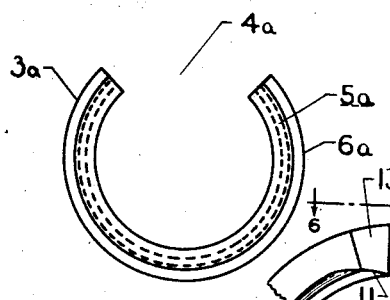
Figure 3 shows an end view of a modified form of the bushing illustrated in Figure 2.
Figure 6:
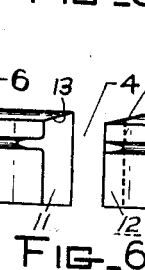
Figure 6 is a top view of the chamfered edge bushing as viewed from a horizontal plane looking in the direction of the arrows of line 6—6 in Figure 5.
Figure 5:
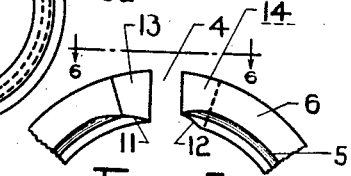
Figure 5 is a side view of a fragmentary portion of one of the electric insulating bushings of the present invention showing the chamfered edges in the slit side of the bushing.

The longitudinal slit 4 in bushing 3 may be made in the form of a plain cut through the bushing, a diagonal cut, an offset diagonal cut, a spiral cut, and as shown in Figures 5 and 6, the edges 11 and 12 of the bushing at slit 4 may be oppositely chamfered. Chamfering in this manner facilitates radial telescoping of the ends of the bushing at the point where same is cut. In preferred construction, the rib 5 and edges 13 and 14 of flanged end 6 would also be chamfered in similar manner. The term "chamfered" as thus used is intended to indicate the cutting away of an angular edged piece of material, while the term "oblique" cut or slit is intended to broadly cover both chamfered edges, and other edges having a like contour but formed by any conventional procedure. The chamfering permits the bushing to readily telescope along the slit edge 4 and thus facilitate the insertion or removal of the bushing from the end of a suitable conduit or the like, while permitting the maximum coverage of the inside circumference of same. The slit 4 of bushing 3 may be longitudinal, spiral, at an angle varying from longitudinal, offset, or otherwise, so long as the principles involved in the use of the slit are followed. The illustration of the slit as shown in the drawings is to be considered as diagrammatic of the many equivalent forms that the slit may assume.

Where a mere cradling action for the electric wires is desired, then the slit 4 may be made wide, for instance, as is shown at 4a in Figure 3, while retaining the advantages of insulating and using the rib 5a for holding the bushing in place.

Figure 4:
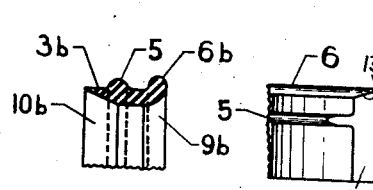
Figure 4 is a sectioned view of a fragmentary portion of a modified form of the bushing shown in Figure 1.

To make the electric insulating bushing more flexible, the flanged end 6b may be made narrower and the whole bushing shorter, as shown in the sectioned portion of Figure 4. This is particularly advantageous where a relatively stiff insulating material is used in constructing the bushing. The insulating bushing shown in Figure 13 also has a short skirt with rounded inner end 10f to facilitate the drawing of wires thereover. This form of insulating bushing with its rounded inner end, wide flange 6f and larger rib 5f is exceptionally stable in use and not easy to accidentally dislodge.

Figure 7:
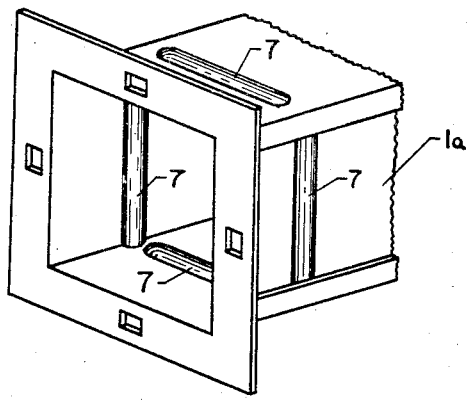
Figure 7 shows a perspective end view of a rectangular raceway having inwardly projecting ribs adjacent its end.
Figure 8:
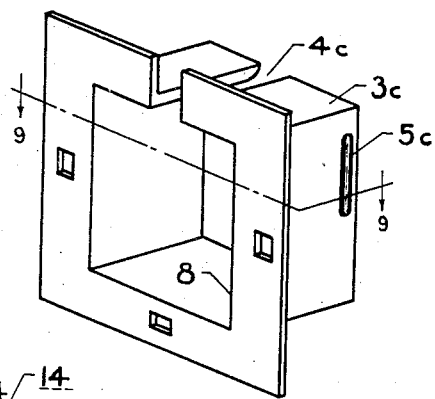
Figure 8 shows in perspective an electric insulating bushing adapted to fit in the end of the rectangular raceway shown in Figure 7.
Figure 9:
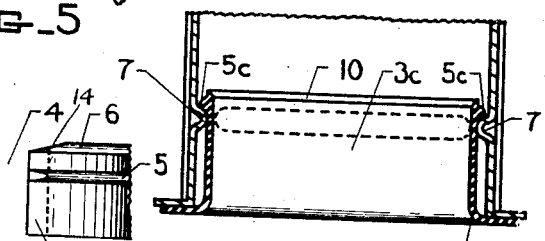
Figure 9 is a sectioned assembly view of a rectangular electric insulating bushing installed in the end of a rectangular raceway as taken along the line 9—9 of the bushing of Figure 8 with the exception that the outlet end of the bushing is modified to show a rounded construction.

The metal conduit or raceway instead of being of round tubular construction may, for instance, be of rectangular form 1a, as is shown in Figure 7. Where this type of raceway is used, it should be provided with two or more inwardly depressed ribs 7 or the equivalent. The rectangular insulating bushing 3c shown in Figure 8 is designed to fit the end of the rectangular raceway illustrated. This bushing is preferably provided with outward projecting ribs 5c on its opposite sides near the upper edge thereof as shown in Figure 8. When the bushing is slipped in place in the end of the rectangular conduit 1a, the ribs 5c are preferably adapted for engaging the back edge of two of the ribs 7 as shown in section in Figure 9. The bushing 3c may be provided with a square cut outlet edge 8 as shown in Figure 8, or may be provided with a rounded outlet edge 9 as shown in Figure 9. The inner end 10 of the bushing is also preferably rounded or tapered to facilitate the passage of conductor wires through the bushing, as well as to aid in the installation of the bushing in old constructions with the wires already in place. The use of rounded or tapered ends has the further advantage of eliminating sharp edges on which the insulation covering of the wires might wear through, and at the same time aids in preventing accidental removal of the bushing when wires are drawn therethrough. Other forms of the insulating bushing utilizing the rounded or tapered inner edges are shown in Figures 4, 11, 12, and 13.

Figure 12:
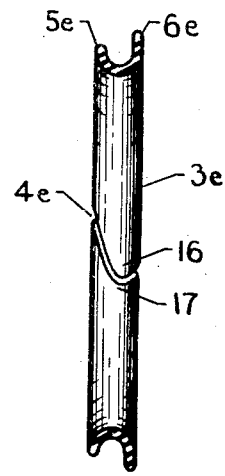
Figure 12 is a section at the diameter of one form of the insulating bushings of the present invention, and showing an offset angular cut.
Figure 13:
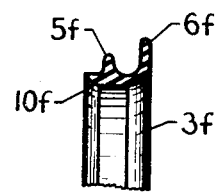
Figure 13 is a sectioned view of a fragmentary portion of a modified form of the bushing shown in Figure 4.

The cap 2 shown in Figure 1 as threadedly engaging the end of conduit 1 is commonly known as a bushing or metal bushing and acts to provide a rounded edge over which the insulated wires passing through the conduit 1 may rest. Vibration, sharp angle of emergence of the insulated wires from the end of conduit 1, or both of these elements, are the common cause of breakdown of the insulation on the wires so as to permit shorting on the metal bushing 2. The overcoming of this hazard is one of the objects of the present invention, and to that end one embodiment of this invention may be considered to be a bushing in the form of a metal bushing 2 having a removable insulator mounted on its rounded edge which normally contacts the wires passing through the conduit 1. Several forms of this construction are illustrated in the drawings. Figure 1, for instance, shows such construction with the skirt of the insulating portion of the bushing extending a moderate distance down the inner face of conduit 1. Figures 4 and 13 illustrate the use of a very short skirt, while Figures 11 and 12 illustrate the complete elimination of the extending skirt.

Figure 10:
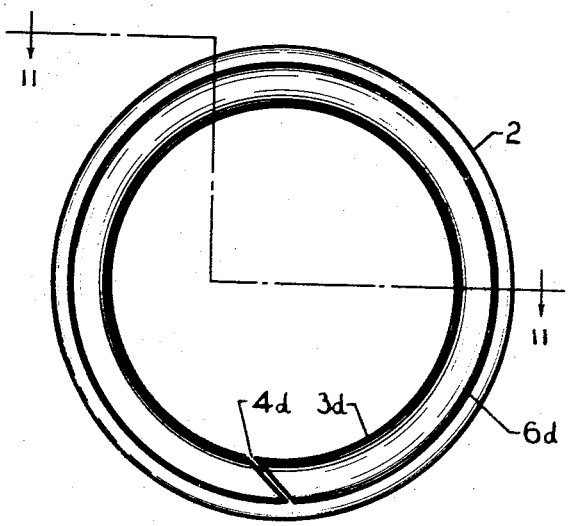
Figure 10 is an end view of the combination of a metal bushing with an electric insulating bushing mounted thereon.
Figure 11:
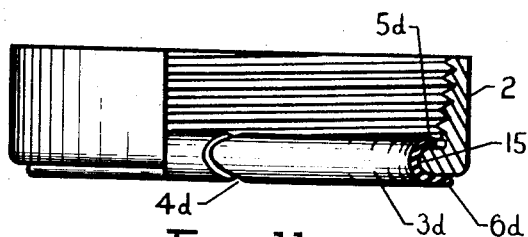
Figure 11 is a partially sectioned assembly view of one form of the present invention as taken along line 11—11 of Figure 10.

Referring to Figures 10 and 11, the cap or metal bushing 2 is shown equipped with an insulating bushing 3d having a flanged end 6d and an inner rib edge 5d with a circumferential groove therebetween adapted to receive the rounded inner edge 15 of the flanged end of metal bushing 2. In order to permit the insulating bushing 3d to be removed or installed on the job, it is cut crosswise to permit telescoping action. By making this cut at an angle of approximately 45° to 50° with the diameter of the bushing at the point of its intersection with the start of the cut at the outer circumference of the bushing, the flange width being approximately no larger in proportion to the inner diameter of the bushing than shown in Figure 10, telescoping for insertion or removal may be readily accomplished with a relatively narrow cut 4d as shown in Figure 10. A straight-across cut 4d, such as is shown in Figures 10 and 11, is satisfactory for most purposes. However, the cut may be made in a plane at an angle varying from perpendicular to the face of the end of the bushing, and when this is done, the cut embodying one such offset angle will have the appearance shown at 4e in Figure 12. The offset angle is preferably in the range of from 3° to 10° from perpendicular to the face of the end of the bushing, the latter preferably being perpendicular to the longitudinal axis of the bushing, though the invention is not limited to this specific range. This angular cutting simplifies the making of the cut, permits sidewise springing to provide an opening to slip over wires already installed, and when made in the direction shown in Figure 12, aids in locking the removable insulating bushing against being pulled out of place when wires are pulled through the conduit 1 and out of the end of the conduit in a direction opposite to that in which the insulating bushing is installed. This added locking effect is due to the cut 4e being made so that the cut on edge 17 of insulating bushing 3e slopes outward toward the flanged end 6e. Under these conditions, if the insulating bushing 3e is subjected to removal force by the pulling of wires through the conduit 1 in connection with which it is used, this force will cause edge 16 to approach edge 17 and close the gap 4e. Any movement of edge 16 to the right and up the face of edge 17, as viewed in Figure 12, would, due to the offset angle of cut 4e, produce for a given increment of travel a less elevation of edge 16 for disengaging purposes than would be the case if the offset angle cutting was oppositely inclined, which would give an increased inclined plane effect. In other words, with the offset cutting as shown in Figure 12, edge 16 would have to travel up the face of edge 17 a greater distance for disengaging than would be the case if the offset cutting was in the opposite direction. This extra travel necessary to removal due to forces applied against the inner or rib edge 5e of the insulating bushing 3e produces an extra security or locking effect against removal. At the same time, placing the offset cut as shown in Figure 12 aids in the installation of the insulating bushing 3e, since under such circumstances, the installing force is applied from the side of the flanged edge 6e of edge 16 with edge 17 mounted on the flanged end of metal bushing 2. This takes advantage of the inclined plane effect of moving edge 16 to the left across edge 17, while edge 16 is sliding up the face of edge 17. The use of an angular cut, which may be either straight across as shown in Figures 6, 10, and 11, or offset as shown in Figure 12, presents the added advantage of having the under edge at the cut act as an underlapping insulator which will protect the wires passing through the bushing from grounding on the edge of metal bushing 2 at that point.

Figure 14:
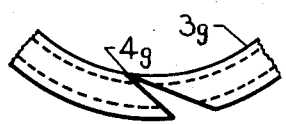
Figure 14 is a side view of a fragmentary portion of one form of insulating bushing of the present invention, and showing a modified form of cut.

By modifying the angular cut as shown in Figure 14, the inner circumference of the bushing may be normally closed at slit or cut 4g when in place, while the outer circumference is sufficiently open at the cut to facilitate telescoping action in installing or removing the insulating bushing from the metal bushing on which it is adapted to be mounted.

The bushings of the present invention may be made from various electric insulating materials, such as hard rubber, ethocel, "Bakelite," fiber, or relatively hard, heat, moisture and electricity resisting, resilient plastic material of cellulosic or phenolic resin base, or the like. These bushings preferably should have a very low moisture absorbing capability, and not to exceed two per cent absorption after twenty-four hours immersion in water. The bushings also should be moderately flexible without brittleness and yet have sufficient resilience to snap back substantially to original size after stretching to pass over wires already installed or compressed to permit insertion in the end of a suitable conduit or raceway. Fiber bushings of high electric insulating value and low moisture absorbing capability have been found exceptionally satisfactory for this purpose, as has molded ethocel plastic, although the bushing is not limited to construction from such materials.

Other modes of applying the principle of my invention may be employed instead of those explained, change being made as regards the articles herein disclosed, provided the means stated by any of the following claims or the equivalent of such stated means be employed.

I therefore particularly point out and distinctly claim as my invention:

1. An electric insulating bushing which is formed of electric insulating material which is relatively hard, resilient, and of low moisture absorbing capability, said bushing having a substantially ring-shaped body circumferentially grooved on its outer face and cut crosswise to permit change of diameter of the body, said cut being oblique to a plane tangent to said bushing at its outer diameter at the cut to facilitate radial telescoping of the ends of said body.

2. A tubular bushing circumferentially grooved on its outer face and rounded on its inner face to form a substantially U-shaped cross section body, said bushing having a crosswise slit with its edges oblique to a plane tangent to said bushing at its outer diameter at the slit, said slit facilitating radial telescoping.

3. An electric insulating bushing which has a substantially parallel ended and ring-shaped U-cross section body cut crosswise, the adjacent faces of said body at said cut being spaced apart and oblique to a plane including the axis and outer edge of said bushing at the start of said cut to facilitate radial telescoping so as to cooperate in permitting change of diameter of said body in either direction, a flange and a rib on the outer circumference of said body, said flange and rib being spaced apart and substantially parallel to each other in manner forming the legs of said U.

4. An electric insulating bushing which has a substantially ring-shaped body cut crosswise, said cut being such that the faces of the adjacent edges thereof are oblique to a plane tangent to said bushing at its outer diameter at the cut so as to cooperate in facilitating radial change of diameter of said body by telescopic action, an outturned radial flange and a radial rib on the outer circumference of said body, said flange and rib being spaced apart and substantially parallel to each other, the plane of said cut also being slightly out of perpendicular to the plane of the flange.

5. An electric insulating bushing which has a longitudinally cut tubular body, the adjacent faces of said body at said cut being spaced apart and oblique to a plane tangent to said bushing at its outer diameter at the cut to facilitate radial telescoping and cooperate in permitting change of diameter of said body in either direction, an outturned flange at one end of said body, and a low rib-like means on the outer face of said tubular body intermediate of its ends and substantially parallel to said flange.

6. A bushing which has a ring-shaped body, circumferentially grooved on its outer face and slit crosswise to form spaced apart faces which are oblique to a plane tangent to said bushing at its outer diameter at the start of the slit, said slit facilitating radial telescoping thereof, the plane of said slit lying approximately in the range of from 3° to 10° out of perpendicular to a plane perpendicular to the longitudinal axis of the bushing.

7. A bushing which has a ring-shaped body circumferentially grooved on its outer face to form a substantially U-shaped cross section body, and slit crosswise to form spaced apart faces facilitating radial telescoping thereof, said slit starting at the outer circumference of said body and forming an angle of approximately 45° to 50° with the diameter of the bushing at said starting point, the outer and inner diameters of said bushing being of proportions allowing said slit to intersect the inner circumference of the bushing.

8. A bushing which has a ring-shaped tubular body formed of electric insulating material which is relatively hard, resilient, and of low moisture absorbing capability, said bushing having a flange and rib separated by a groove on the outer circumference thereof to form a substantially U-shaped cross section body, said bushing being slit crosswise to form spaced apart faces facilitating radial telescoping thereof, said slit starting at the outer circumference of said body and forming an angle of approximately 45° to 50° with the diameter of the bushing at said starting point, the outer and inner diameters of said bushing being of proportions allowing said slit to intersect the inner circumference of the bushing, the plane of said slit lying in the range of from 3° to 10° out of perpendicular to the plane of the flange of said bushing.

HERMAN C. RHODE.